United States Patent
Komoda (10) Patent No.: US 9,286,269 B2
(45) Date of Patent: Mar. 15, 2016

(54) INFORMATION PROCESSING DEVICE AND METHOD FOR CORRECTING LINEAR SEGMENT INFORMATION

(75) Inventor: Toshiyuki Komoda, Kawasaki (JP)

(73) Assignee: FUJI XEROX CO., LTD., Tokyo (JP)

( * ) Notice: Subject to any disclaimer, the term of this patent is extended or adjusted under 35 U.S.C. 154(b) by 1869 days.

(21) Appl. No.: 12/397,386

(22) Filed: Mar. 4, 2009

(65) Prior Publication Data

US 2010/0077299 A1 Mar. 25, 2010

(30) Foreign Application Priority Data

Sep. 19, 2008 (JP) ................. 2008-241300

(51) Int. Cl.
- *G06F 17/00* (2006.01)
- *G06F 17/21* (2006.01)
- *G06F 17/24* (2006.01)

(52) U.S. Cl.
CPC ............ *G06F 17/211* (2013.01); *G06F 17/241* (2013.01)

(58) Field of Classification Search
CPC .................................................... G06F 17/241
USPC .................. 715/243, 246, 252, 247, 253, 209
See application file for complete search history.

(56) References Cited

U.S. PATENT DOCUMENTS

| | | | | |
|---|---|---|---|---|
| 5,227,771 A | * | 7/1993 | Kerr et al. | 715/800 |
| 5,583,981 A | * | 12/1996 | Pleyer | 715/800 |
| 6,392,673 B1 | * | 5/2002 | Andrew et al. | 715/800 |
| 7,430,712 B2 | * | 9/2008 | Arokiaswamy | 715/234 |
| 7,886,221 B1 | * | 2/2011 | Underwood et al. | 715/234 |
| 2004/0236774 A1 | * | 11/2004 | Baird | G06F 17/241 |
| 2005/0091027 A1 | * | 4/2005 | Zaher | G06F 17/241 703/22 |
| 2005/0172222 A1 | * | 8/2005 | Andrew | 715/517 |
| 2007/0220480 A1 | * | 9/2007 | Waldman et al. | 717/106 |
| 2007/0298399 A1 | * | 12/2007 | Shao | G06F 17/241 434/317 |
| 2008/0168388 A1 | * | 7/2008 | Decker | 715/800 |
| 2009/0015717 A1 | * | 1/2009 | Arnao et al. | 348/581 |
| 2009/0217158 A1 | * | 8/2009 | Bailey | 715/255 |

FOREIGN PATENT DOCUMENTS

| | | |
|---|---|---|
| JP | 7-152741 A | 6/1995 |
| JP | 8-95965 A | 4/1996 |
| JP | 2003-271589 A | 9/2003 |

* cited by examiner

*Primary Examiner* — Mohammed-Ibrahim Zuberi (74) *Attorney, Agent, or Firm* — Sughrue Mion, PLLC (57) ABSTRACT

An information processing device includes: a receiving unit; a discriminating unit; a plotting unit; a determining unit; a correcting unit; and a linear segment plotting unit.

8 Claims, 7 Drawing Sheets

| KIND OF ADDED DOCUMENT INFORMATION | EXTEND-OUT | POSITION FIXING |
|---|---|---|
| CHARACTER CHAIN | DONE | NOT DONE |
| LINEAR SEGMENT | NOT DONE | NOT DONE |
| OTHER GRAPHIC AND OTHERS | NOT DONE | DONE |

INFORMATION PROCESSING DEVICE AND METHOD FOR CORRECTING LINEAR SEGMENT INFORMATION

CROSS-REFERENCE TO RELATED APPLICATIONS

This application is based on and claims priority under 35 U.S.C. 119 from Japanese Patent Application No. 2008-241300 filed Sep. 19, 2008.

BACKGROUND

Technical Field

This invention relates to an information processing device, an information processing method, and a computer readable medium.

SUMMARY

According to an aspect of the present invention, an information processing device includes: a receiving unit that receives information changing the arrangement range of a document element to be arranged within a predetermined plotting region, and that receives, as an object to be processed, additional information associated with a position designated on the plotting region and linear segment information to be plotted between a pair of positions designated on the plotting region; a discriminating unit that discriminates a linear segment information relative to the additional information based on a designated position of the additional information and a designated position of the linear segment information; a plotting unit that plots the document element within the plotting region based on the information changing the arrangement range; a determining unit that determines a position of at least a part of the additional information based on an arrangement range before the document element has been changed, an arrangement range after the document element has been changed, and the designated position of the additional information; a correcting unit that corrects, if there is any linear segment information relative to the additional information whose position has been determined by the determining unit, a position of one of terminal points of the linear segment information based on the position of the relative additional information; and a linear segment plotting unit that plots the linear segment information based on a correction result obtained by the correcting unit.

BRIEF DESCRIPTION OF THE DRAWINGS

Exemplary embodiment of the present invention will be described in detail based on the following figures, wherein.

DETAILED DESCRIPTION

Figure 1:
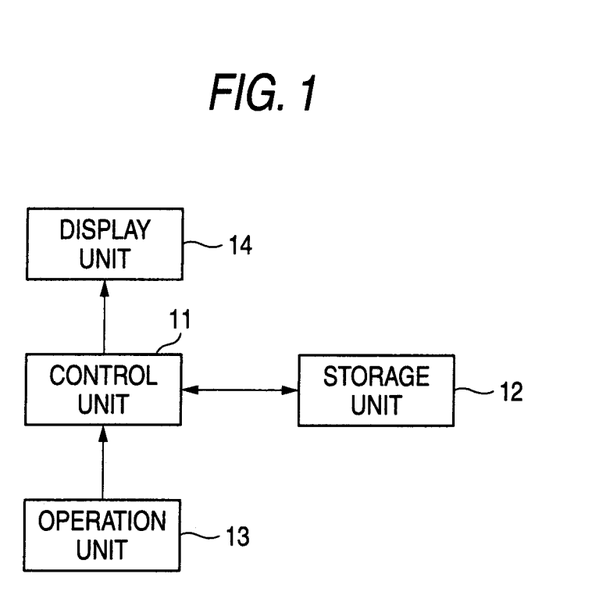
FIG. 1 is an arrangement block diagram showing an example of the information processing device according to an embodiment of this invention.

Now referring to the drawings, an explanation will be given of an embodiment of this invention. As illustrated in FIG. 1, an information processing device 1 according to this embodiment includes a control unit 11, a storage unit 12, an operation unit 13 and a display unit 14.

Now, the control unit 11 is a program control device such as CPU (Central Processing Unit) and operates according to the program stored in the storage unit 12. In this embodiment, the control unit 11 receives basic information such as application data and also receives a plotting instruction of additional information correlated to a designated position on the basic information and the information of a linear segment (linear segment information) to be plotted between a pair of designated positions on the basic information. It discriminates the linear segment information relative to the additional information, and when a plotting position such as the arrangement range of the additional information is changed, it adjusts the arrangement range of the linear segment information relative to the pertinent additional information changed and moves the position of one of the terminal points of the linear segment information according to the movement of the additional information. The contents of detailed processing of the control unit 11 will be described later in detail.

The storage unit 12 includes a storage element such as RAM (Random Access Memory). The storage unit 12 stores the program to be executed by the control unit 11. The program may be stored in a computer-readable recording medium such as DVD-ROM (Digital Versatile Disc Read Only Memory) so as to provide and copied into the storage unit 12. The storage unit 12 also operates as a work memory for the control unit 11.

The operation unit 13 is a keyboard or mouse which receives an operation by a user and outputs the contents of the operation to the control unit 11. The display unit 14 is for example a display and the like which displays the information according to an instruction inputted from the control unit 11.

Figure 2:
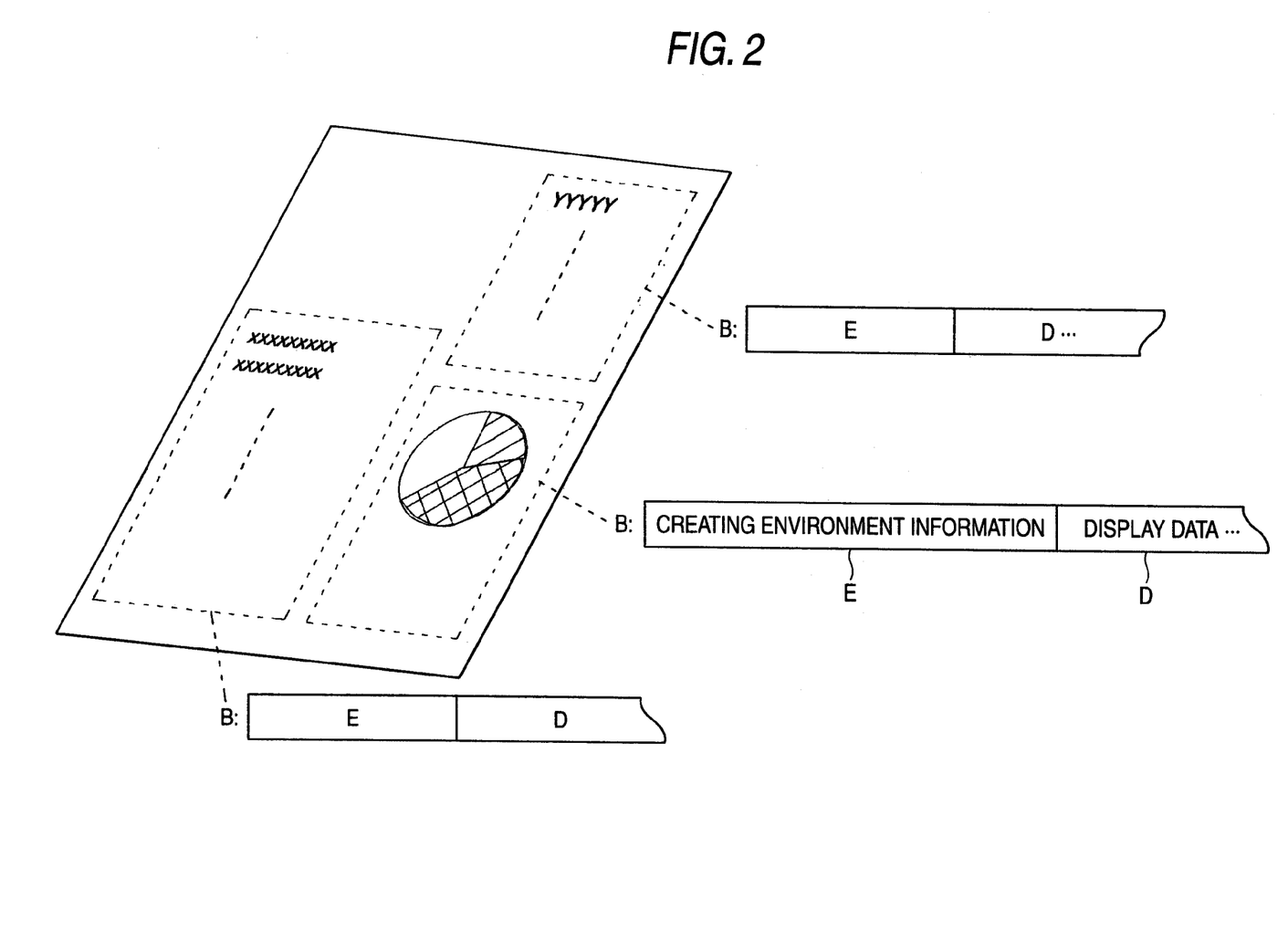
FIG. 2 is a view for explaining an example of the complex document information which is an object to be processed by the information processing device according to an embodiment of this invention.

The information to be processed by the information processing device according to this embodiment is complex document information containing various document elements such as a text, a graph, a table and a graphic as illustrated in FIG. 2. These document elements are displayed in a state where they can be superposed on one another. For example, the complex document information to be processed by this embodiment contains document element information items B each representative of at least one document element.

Specifically, as illustrated in FIG. 2, each document element information item B contains creating environment information E representative of the information and the like specifying an creating application and display data D. The creating environment information E contains the information specifying the application program used to create the document element information B. The display data D is the information used in displaying the document element information item B. For example, the display data D is expressed in a certain method regardless of the kind of the application used to create the data such as a postscript language (trademark).
(Creation of Document Element Information)

An application data A which is a source of the document element information is created by an application program such as a word processor. The control unit 11 executes conversion processing in response to an input of the application data A thereby to create the document element information B.

Now, the processing of creating the document element information item B by the control unit 11 will be explained. In response to an input of the application data A (one manner of the basic information in this invention), on the basis of this application data A, the control unit 11 creates the display data D containing a plotting command chain. The control unit 11 classifies the commands in the plotting command chain into a text plotting command, an image plotting command, a line plotting command. In the plotting command chain, a portion where the commands belonging to the same class continue is extracted as a block. For example, where there is a command chain consisting of 1. text plotting command
2. text plotting command
3. line plotting command
4. line plotting command
5. text plotting command extracted are three blocks of a block consisting of text plotting commands of 1 and 2; a block consisting of line plotting commands of 3 and 4; and a block consisting of the text plotting command of 5.

The control unit 11, using the command chain section of each block extracted as a single display data D, creates, for each display data D, the document element information item B correlated with the creating environment information E specifying the application program having created the application data A.

The control unit 11 creates the complex document information including the document element information items B thus created and the application data A.
(Display of Complex Document Information)

The control unit 11 in this embodiment, when display of the complex document information containing the document element information items B thus created is requested by the user, successively reads out the document element information items B to extract the display data D contained in each of the document element information items thus read B and plots an image within a predetermined plotting region on the basis of the display data D extracted. Now, it is assumed that the plotting region is e.g. a region with the size of the medium (e.g. sheet of paper) having a predetermined size.

The control unit 11, upon completion of plotting the image designated by the display data D contained in all the document element information items B, outputs the result of the plotting. For example, the result is displayed on the display unit 14.
(Additional Document Element Information)

Further, the control unit 11 may create a new document element information item correlated with any (designated element) of the displayed document element information items, designated by the user while complex document information is displayed. The document element information item not based on the application data A but added by designation by the user will be referred to as an additional document element information item in the following description. Where both document element information items must be discriminated from each other, the document element information item other than the additional document element information item is referred to as an ordinary document element information item.

For example, the control unit 11 receives, from the user, inputting of not only the kind of information item (character chain, pattern, linear segment, etc.) to be correlated, but also the contents of the pertinent information item (information itself of the character chain) and the position (adding position) where the information is correlated. For example, where the character chain is designated, the control unit 11 causes the user to designate the adding position. The user may designate the adding position using the pointing device such as the mouse. On the basis of an instruction inputted by the user, the control unit 11 creates the display data D representative of the image to be plotted. Further, the control unit 11, assuming that the coordinate information on the plotting region designated by the user is the information representative of the adding position, creates the document element information item B (additional document element information item) containing the information L representative of the adding position, the information representative of being the additional document element information item and the display data D created and incorporates the document element information item thus created in the complex document information being displayed.

Further, where a linear segment information item is designated as the information to be correlated, the control unit 11 causes the user to designate two adding positions of its starting point and ending point (terminal points with an arrow). In this case, the control unit 11 creates the display data D representative of the linear segment information item connecting the designated adding positions. The control unit 11 creates the document element information item B (additional document element information item) containing the information L representative of the one (ending side) of the designated adding positions, the information representative of being the additional document element information item and the display data D created and incorporates the document element information thus created in the complex document information being displayed.
(Re-Editing)

Further, the control unit 11 receives an instruction that the complex document information should be edited using an application. At this time, the control unit 11 reads out the information specifying the application from the environmental information E contained in the ordinary document element information item B created on the basis of the application data and actuates the application program designated by this information. As processing of the application program, the control unit 11 starts to edit (change) the application data A contained in the complex document information.

In order to obtain the document element information item B' corresponding to the application data A' after changed, created by the application program, the control unit 11 must execute the processing of creating the complex document information again. However, by only executing the processing of creating the complex document information, the additional document element information item, which has been contained in the complex document information as well as the document element information item B before edited, cannot be incorporated.

So, the control unit 11, in the processing of creating the complex document information after edited, creates the display data D' based on the application data A' after changed, adds the additional document element information item contained as well as the document element information item B before changed and the corresponding correlated information, and adjusts the adding position of the additional document element information item according to the result of editing.

Figure 3:
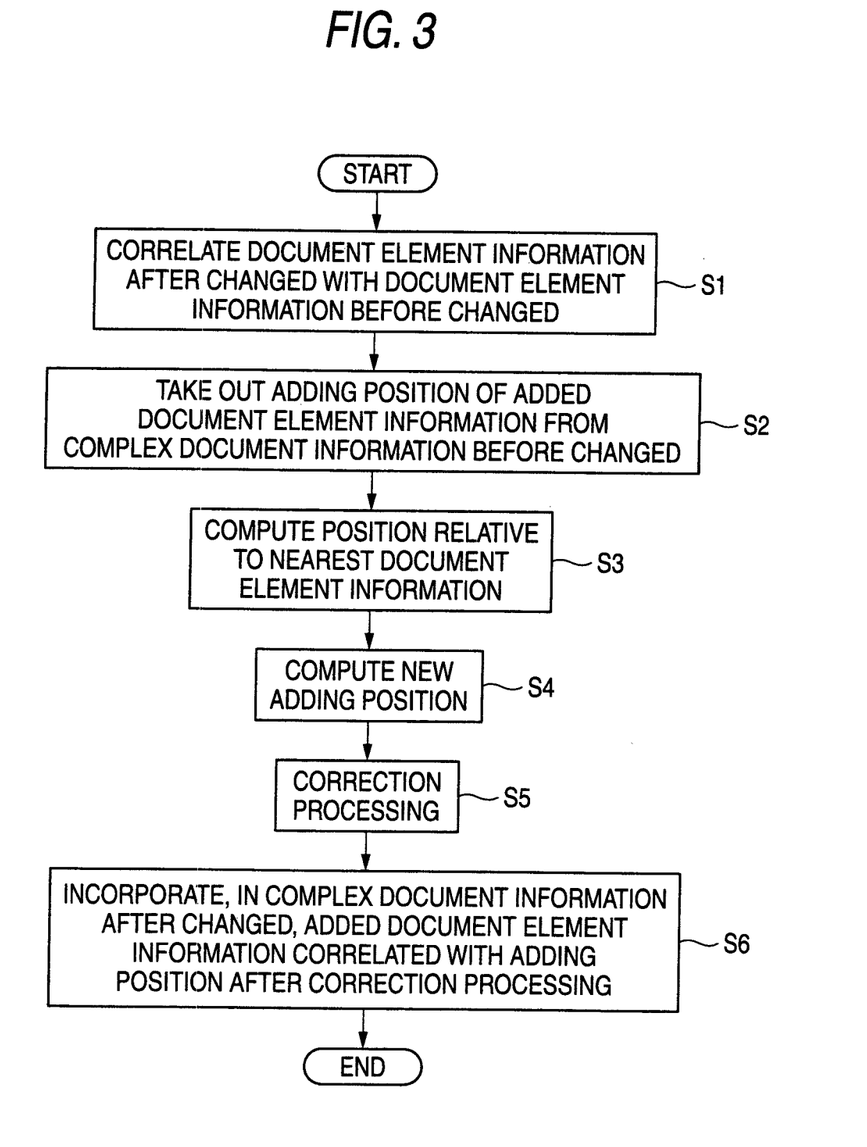
FIG. 3 is a flowchart showing a processing example by the information processing device according to an embodiment of this invention.

Concretely, the control unit 11 starts the processing illustrated in FIG. 3 as the processing of adding the additional document element information item again. The control unit 11 retrieves the document element information item B before changed corresponding to each of the document element information items B' contained in the complex document information after changed (S1).

In this processing S1, the control unit 11 classifies each of the document element information items B' into a character chain, an image or a line. Further, referring to the classifying result, as for the document element information item B of the character chain, the control unit 11 selects, as the corresponding document element information item B, the document element information item B in which the largest number of character chains contained coincide with each other among the document element information items B of the character chain before changed, contained in the complex document information before changed.

As for the document element information item B' classified as the image, the control unit 11 selects, as the corresponding document element information item B, the document element information item B in which the larger number of pixel values coincide with each other by comparison in the image size and pixel contents among the document element information items B of the character chain before changed, contained in the complex document information before changed.

Further, as for the document element information item B' classified as the line, the control unit 11 selects, as the corresponding document element information item B, the document element information item B in which the largest number of contents of plotting commands coincide with each other among the document element information items B of the character chain before changed, contained in the complex document information before changed.

The control unit 11 previously creates and stores a table in which the corresponding document element information item B before changed is correlated with each of the document element information items B' contained in the complex document information after changed. Further, the control unit 11 extracts the additional document element information items from the complex document information before changed and takes out the information indicative of the adding positions (S2).

The control unit 11 retrieves the document element information item B before changed, nearest to the information indicative of the adding position taken out for each of the additional document information items. Thus, in the case of the additional document element information item of the linear segment information having two designated positions, the document element information item B near to the ending point is found by retrieval. The control unit 11 computes the position relative to the document element information item B before changed found as a result of retrieval (S3). Now, for example assuming that the left upper corner coordinates and the right lower corner coordinates of the area (a square area is supposed) occupied by the image plotted by the document element information item B are P(Xlt, Ylt) and Q(Xrb, Yrb), respectively, where the adding position of the additional document element information item is R(Xa, Ya), the relative position may be the values computed by the following equation:

$Xrel=Xa/(Xrb-Xlt)$ $Yrel=Ya/(Yrb-Ylt)$

For the document element information item B' contained in the complex document information after changed corresponding to the document element information item B before changed, found by processing S3, using the left upper corner coordinates and the right lower corner coordinates P'(X'lt, Y'lt) and Q'(X'rb, Y'rb) of the area (a square area is supposed) occupied by the image plotted by the document element information item B' and the information Xrel, Yrel of the relative position previously computed for each additional document element information item, the control unit 11 computes the coordinate information of a new adding position for each additional document element information item (S4):

$X'a=Xrel\times(X'rb-X'lt)$ $Y'a=Yrel\times(Y'rb-Y'lt)$

Figure 4A:
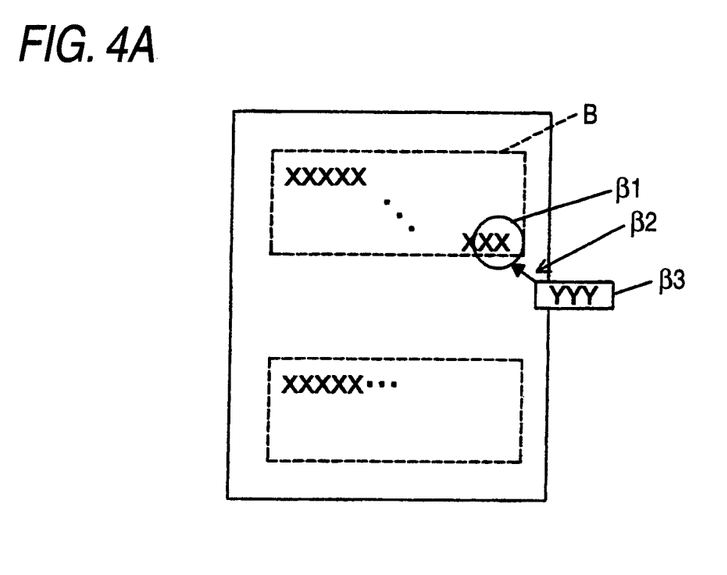
FIGS. 4A and 4B are views of an arrangement example of additional document element information items after changed by the information processing device according to an embodiment of this invention.

However, if being maintained in this way, an inconvenience as illustrated in FIG. 4 occurs. Specifically, where there is a document element information item B including a character chain, it is assumed that have been added onto this document element information item B are an additional document element information item β1 of a circular graphic, an additional document element information item β3 of the character chain located around the document element information item B to cross the boundary of the plotting region so that a part thereof extends out from the plotting region and an additional document information item β2 of the linear segment connecting these additional document element information items β1 and β3 (FIG. 4A).

Figure 4B:
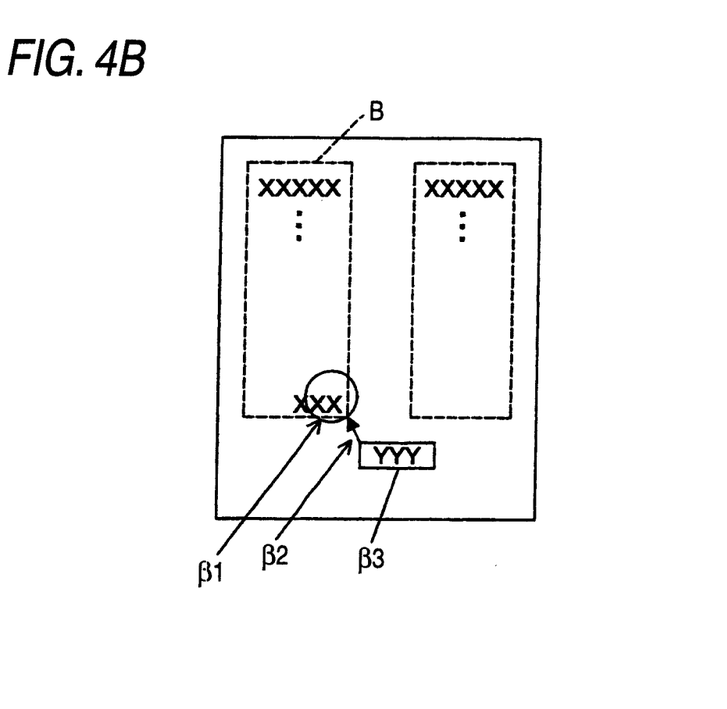

Now, if the shape of the document element information item B is changed in a vertically longer shape so that its right side is moved leftward, the positions of the additional document element information items β1 to β3 are changed into the left side, according to the movement of the positions of the right side by the document element information (FIG. 4B). As a result, the entirety of the additional document information element item β3 partially extended out from the boundary of a predetermined plotting region will be included within the plotting region.

Figure 5A:
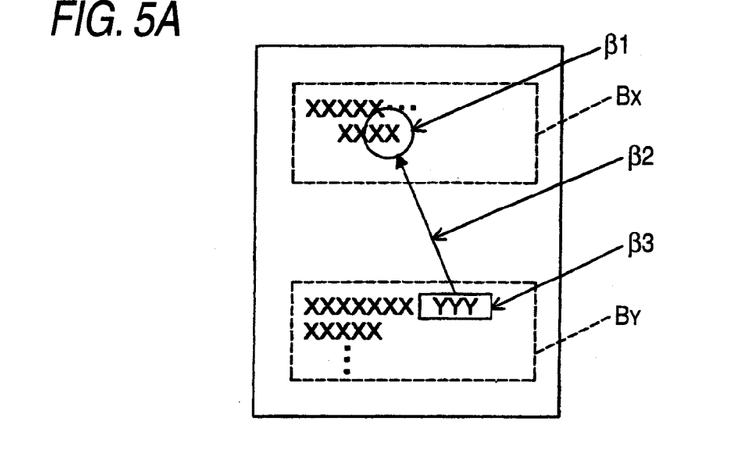
FIGS. 5A and 5B are views of another arrangement example of additional document element information items after changed by the information processing device according to an embodiment of this invention.

Further, as an example of the inconvenience, it is assumed that as illustrated in FIG. 5A, first, two wide document element information items Bx and By are arranged on the upper and lower sides. Now, it is assumed that the user arranged an additional document element information item β1 of the circular graphic onto the upper document element information item Bx, arranged an additional document element information item β3 of the character chain onto the lower document element information item By and added an additional document element information item β2 connecting these additional document element information items β1 and β3. The intention of adding these additional document element information items is to correlate any of these additional document element information items β1 to β3 with the upper document element information item Bx. However, since the additional document element information item β3 of the character chain is included within the lower document element information item By, the control unit 11 computes new adding positions of the additional document element information items β1, β2 on the basis of the positions relative to the upper document element information item Bx, but computes a new adding position L of the additional document element information β3 on the basis of the position relative to the lower document element information item By.

Figure 5B:
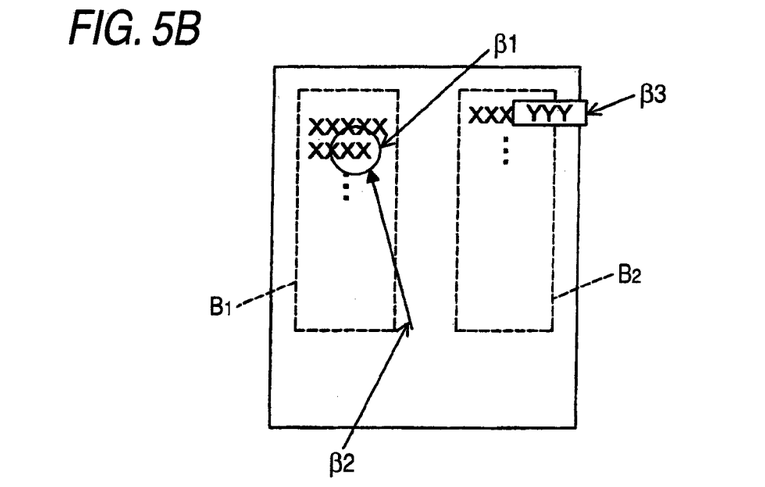

At this time, when the user operates the application to change the shape of each of the document element information items Bx and By in a vertically longer shape so that they are located on the right and left sides, the additional document element information items β1, β2 move according to the movement/deformation of the document element information item Bx whereas the additional document element information item β3 will move according to the movement/deformation of the document element information item By. As a result, the positional relationship therebetween will be broken (FIG. 5B).

So, the control unit 11 corrects the adding position of each additional document element information item on the basis of the positional relationship among the additional document element information items (S5).

Figure 6:
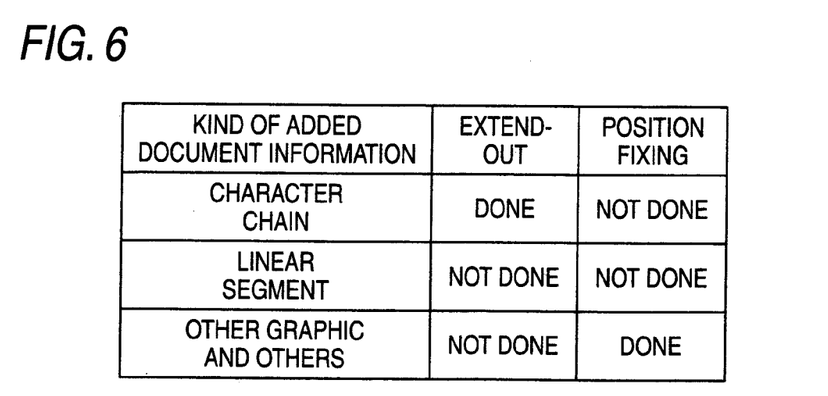
FIG. 6 is a view of a setting example in the information processing device according to an embodiment of this invention.

For the purpose of this correction, for example, the storage unit 12 may previously store a table representative of the contents of applicable correction processing according to the kind of the additional document element information item, as shown in FIG. 6. In the example shown in FIG. 6, according to whether the additional document element information item is the character chain information, linear segment information or the other graphics and others, it is determined that the pertinent additional document element information item should be partially projected (extended out) externally from the boundary of the plotting region and its adding position should be moved. Namely, in the example of FIG. 6, for the character chain information item, the correction of moving its adding position so that the information item is extended out may be done; for the linear segment information, the correction of moving its adding position but not extending out the information item may be done; and for the other graphic or others, its adding position is not moved.

(Correction Based on the Relationship with Other Additional Document Element Information Items)

Figure 7:
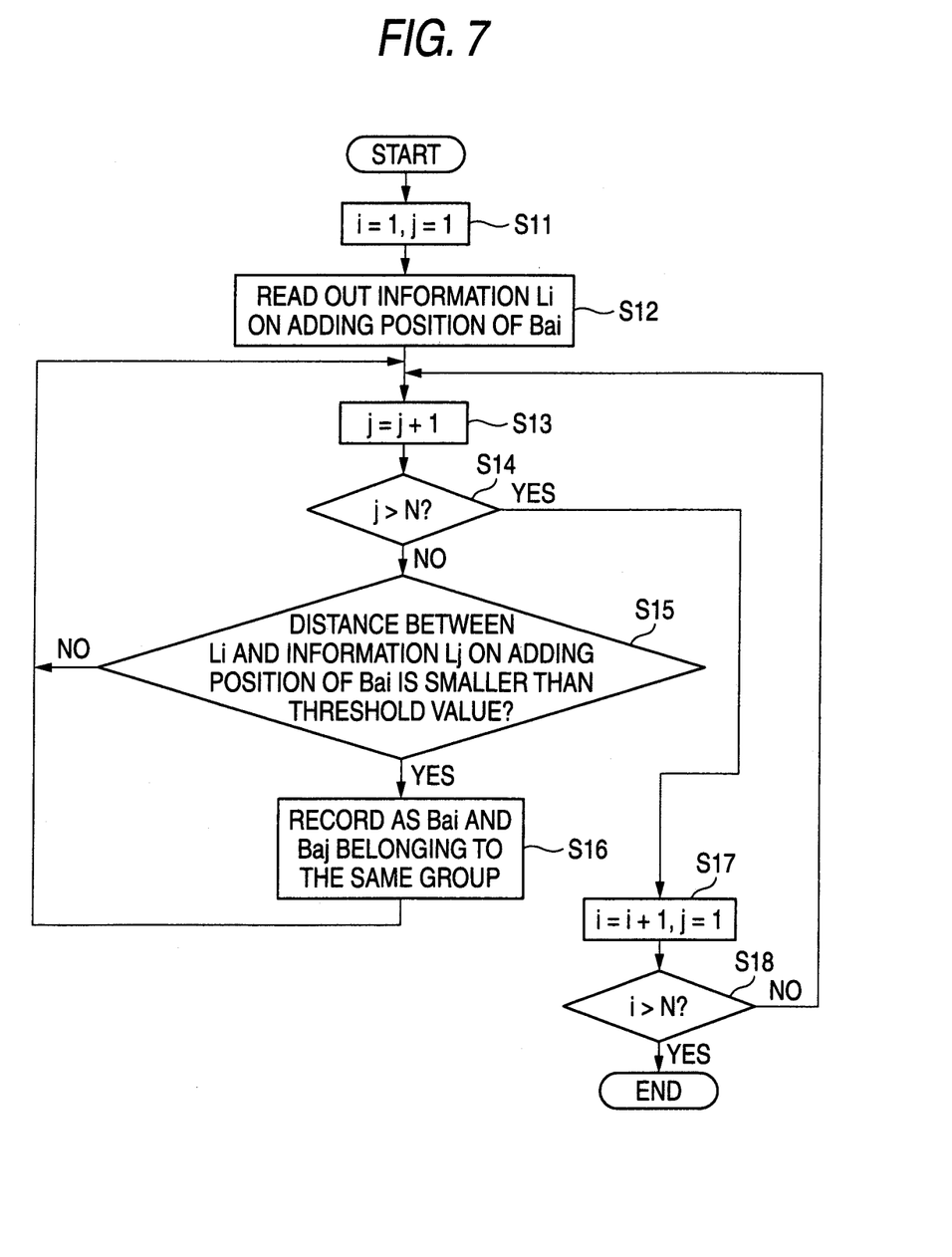
FIG. 7 is a flowchart of a grouping example of additional document element information items.

The control unit 11, in processing S5, may execute the correction based on the relationship with the other additional document element information items in the complex document information before changed. In the case of executing this correction, each of the additional document element information items contained in the complex document information before changed, the control unit 11 detects a set of additional document element information items having the information of the distance between the adding positions smaller than a predetermined threshold value. For example, for the additional document element information item Bai (i=1, 2, . . . ), the processing as shown in FIG. 7 will be executed.

Specifically, with variables i and j having been initialized to "1" (S11), the control unit 11 reads out the information Li of the adding position of the additional document element information item Bai (S12). The control unit 11 increments the variable j by 1 (S13) to investigate whether or not the variable j is larger than the number N of the additional document element information items (S14). Now, unless j>N, the control unit 11 reads out the information Lj of the adding position of an additional document element information item Baj and investigates whether or not the distance between the addition positions Li and Lj is smaller than the predetermined threshold value (S15).

If the distance between the adding positions Li and Lj is smaller than the predetermined threshold value, the control unit 11 records Bai and Baj as belonging to the same group (S16) and shifts to processing S13. In processing S15, if the distance between the adding positions Li and Lj is not smaller than the predetermined threshold value, the control unit 11 shifts to processing S13 as it is.

Further, in processing S14, if j>N, the control unit 11 increments the variable i by "1" and sets j=1 (S17) and investigates whether or not the variable i is larger than the number N of the additional document element information items (if or not i>N) (S18). Now, if i>N, the control unit 11 ends the processing. In processing S18, unless i>N, the control unit 11 shifts to processing S13 to continue the processing.

Additionally, in processing S15, where Bai is the additional document element information item of the linear segment information, referring to not only the adding position (ending point of the linear segment information) but also the coordinates Ls on the starting point side of the linear segment information, the control unit 11 investigates whether or not the distance between Ls and Lj is smaller than the predetermined threshold value; and if at least either one of the distance between Li and Lj and the distance between Ls and Lj is smaller than the predetermined threshold value, the control unit 11 may shift to processing S16.

In processing S5, the control unit 11 executes the following processing, while successively selecting, as noted information, the additional document information items whose adding position can be moved among the additional document element information items. Specifically, if the noted information is the additional document element information item on the character chain (correction of extending out is to be done), referring to the adding position of the noted information in the complex document information before changed, the control unit 11 investigates whether or not the noted information has been arranged across the boundary of the plotting region in the complex document information before changed.

Now, if the noted information has been arranged across the boundary of the plotting region in the complex document information before changed, the control unit 11 corrects the coordinate information X'a determined in processing S4 to move the noted information to the position where it is arranged across the boundary of the plotting region. The correction at this time may be, for example, X'a=Xa using the X coordinate Xa of the adding position of the noted information in the complex document information before changed.

Figure 8A:
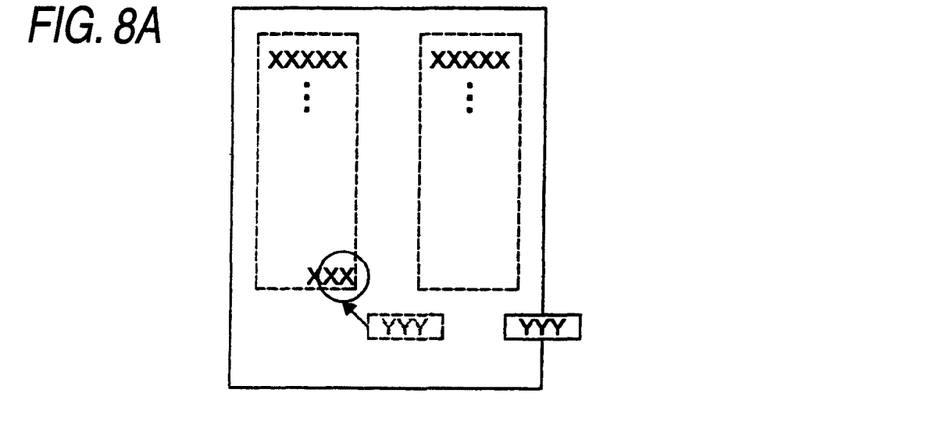
FIGS. 8A to 8C are views for explaining an example of the processing result in the information processing device according to an embodiment of this invention.

In this way, in the example of FIG. 4B, the additional document element information item β3 will be moved to the position where it is arranged across the boundary of the plotting region, as illustrated in FIG. 8A.

Further, the control unit 11 discriminates the additional document element information item of the linear segment information which has been determined as belonging to the same group as the noted information item through the processing illustrated in FIG. 7. If the additional document element information item of the linear segment information belonging to the same group as the noted information (i.e. relative to the noted information) has been discriminated, of the starting point and ending point of the additional document element information item of the linear segment information, the coordinate information of the terminal point nearer to the noted information in the complex document information before changed (near-side terminal point) is moved according to the movement quantity of the noted information. For example, if the noted information is moved by Δx in a X-axis (right-and-left) direction, the above near-side terminal point in the complex document information after changed is moved by Δx in a X-axis.

Figure 8B:
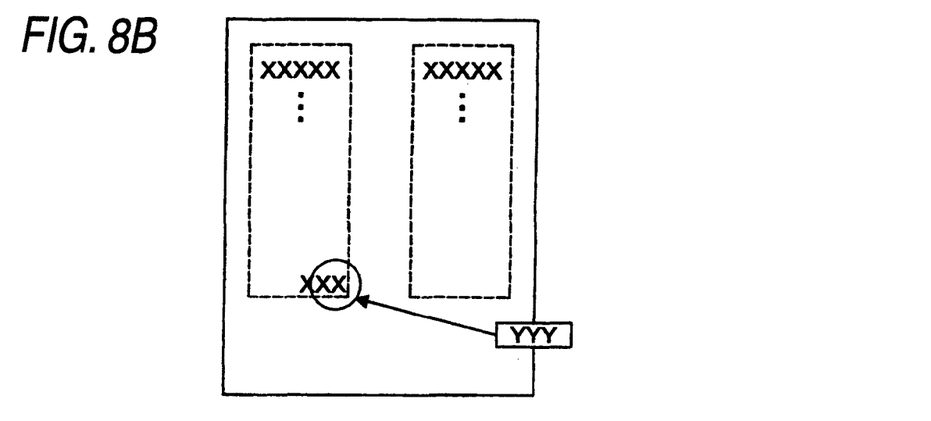

In this way, the terminal point of the linear segment information in FIG. 8A is moved to follow the additional document element information item on the character chain moved at the position of extending-out (FIG. 8B).

Further, if the noted information is the additional document element information item of the linear segment information, by the processing illustrated in FIG. 7, the control unit 11 investigates whether or not there is any additional document element information item on the character chain.

If there is the additional document element information item on the character chain (same group information item) belonging to the same group as the noted information (relative to the noted information), of the starting point and ending point of the additional document element information item which is the noted information, referring to the coordinate information (XL, YL) of the terminal point nearer to the noted information (near-side terminal point) and the information on the adding position (X, Y) of the same group information, the adding position of the same group information item in the complex document information after changed is set at the position away, by (X-XL, Y-YL), from the coordinate information of the near-side terminal of the noted information of the complex document information after changed.

Figure 8C:
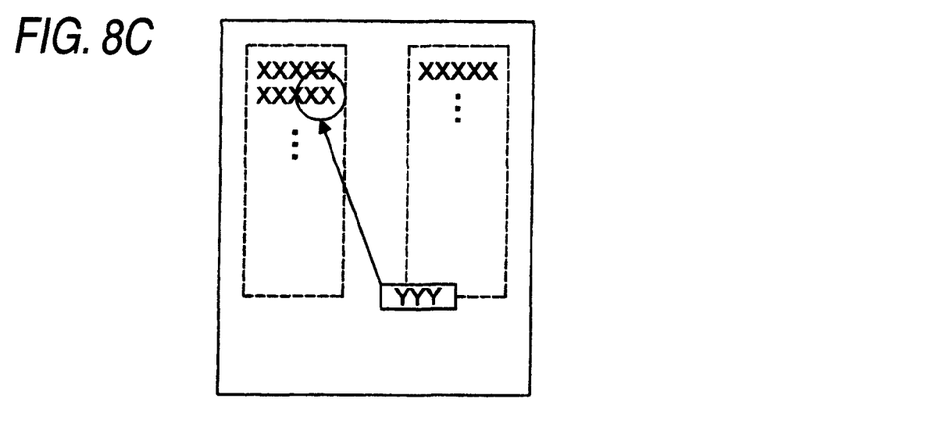

In this example, the positional relationship between the additional document element information items which has been broken as shown in FIG. 5B is reproduced (FIG. 8C).

By the correction processing illustrated above, the control unit 11 reproduces, also in the complex document information after changed, the positional relationship between the additional document element information items in the complex document information before changed.

The control unit 11 incorporates, in the complex document information after changed, the respective additional element information items correlated with the coordinate information of the respective new adding positions by the processing hitherto described (S6), and ends the processing.

Incidentally, in the explanation hitherto made, it was assumed that the additional document element information item independently contains any of the character chain, linear segment information and image. However, there may be some additional document element information items in which plural elements are unified (grouped). In this case, if the user is not satisfied with the correction processing of the adding positions, the control unit 11 may execute the processing shown in FIG. 3, after having separated the elements unified into individual items of the additional document element information according to an instruction by the user.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing device for processing application data including a document element to generate display data in a plotting region, comprising:
   a receiving unit that receives information changing an arrangement range of the document element in the application data and that receives additional information which is plotted with a position designated on the plotting region in the display data and linear segment information which is plotted between a pair of positions designated on the plotting region in the display data;
   a discriminating unit that discriminates a relationship between the linear segment information and the additional information based on the designated position of the additional information and the pair of positions designated of the linear segment information;
   a plotting unit that plots the document element within the plotting region based on the information changing the arrangement range;
   a determining unit that determines a position of the additional information in the plotting region after the arrangement range of the document element has been changed in the application data based on an arrangement range of the document element before the change, an arrangement range of the document element after the change, and the designated position of the additional information in the plotting region before the arrangement range of the document element has been changed; and
   a correcting unit that corrects using a processor, a position of one of terminal points of the linear segment information based on the position of the additional information having the relationship with the linear segment which is discriminated by the discriminating unit, and corrects the position of the additional information to be plotted across a boundary of the plotting region if the designated position of the additional information in the plotting region before the arrangement range of the document element in the application data has been changed is also plotted across the boundary of the plotting region,
   wherein the plotting unit plots the linear segment information and the additional information based on a correction result obtained by the correcting unit.

2. The information processing device as claimed in claim 1, wherein the correcting unit corrects the position of the additional information to a position of being plotted across the boundary of the plotting region.

3. The information processing device as claimed in claim 2, wherein the additional information has been arranged to be plotted across the boundary of the plotting region before the arrangement range of the document element is changed.

4. An information processing method for processing application data including a document element to generate display data in a plotting region, the method comprising:
   receiving information changing an arrangement range of the document element in the application data, and additional information which is plotted with a position designated on the plotting region in the display data and linear segment information which is plotted between a pair of positions designated on the plotting region in the display data;
   discriminating a relationship between the linear segment information and the additional information based on the designated position of the additional information and the pair of positions designated of the linear segment information;
   plotting the document element within the plotting region based on the information changing the arrangement range;
   determining a position of the additional information in the plotting region after the arrangement range of the document element has been changed in the application data based on an arrangement range before the change, an arrangement range after the document element after the change, and the designated position of the additional information in the plotting region before the arrangement range of the document element has been changed;
   correcting using a processor, position of one of terminal points of the linear segment information based on the position of the additional information having the relationship with the linear segment which is discriminated, and correcting the position of the additional information to be plotted across the boundary of the plotting region if the designated position of the additional information in the plotting region before the arrangement of the document element in the application data has been changed is also plotted across the boundary of the plotting region; and plotting the linear segment information and the additional information based on a correction result obtained in the correcting step.

5. A non-transient computer readable medium storing a program causing a computer to execute a process for processing application data including a document element to generate display data in a plotting region, the process comprising:

receiving information changing an arrangement range of the document element in the application data, and additional information which is plotted with a position designated on the plotting region in the display data and linear segment information which is plotted between a pair of positions designated on the plotting region in the display data;

discriminating a relationship between the linear segment information and the additional information based on the designated position of the additional information and the pair of positions designated of the linear segment information;

plotting the document element within the plotting region based on the information changing the arrangement range;

determining a position of the additional information in the plotting region after the arrangement range of the document element has been changed in the application data based on an arrangement range before the change, an arrangement range after the document element after the change, and the designated position of the additional information in the plotting region before the arrangement range of the document element has been changed;

correcting using a processor, a position of one of terminal points of the linear segment information based on the position of the additional information having the relationship with the linear segment which is discriminated, and correcting the position of the additional information to be plotted across the boundary of the plotting region if the designated position of the additional information in the plotting region before the arrangement of the document element in the application data has been changed is also plotted across the boundary of the plotting region; and plotting the linear segment information and the additional information based on a correction result obtained in the correcting step.

6. The information processing device as claimed in claim 1, wherein the additional information and the linear segment information is information input by a user.

7. The information processing method according to claim 4, wherein the additional information and the linear segment information is information input by a user.

8. The non-transient computer readable medium according to claim 5, wherein the additional information and the linear segment information is information input by a user.

* * * * *